July 13, 1971   HIDEO BABA   3,592,698
METAL FUEL BATTERY WITH FUEL SUSPENDED IN ELECTROLYTE
Filed Nov. 18, 1968   2 Sheets-Sheet 1
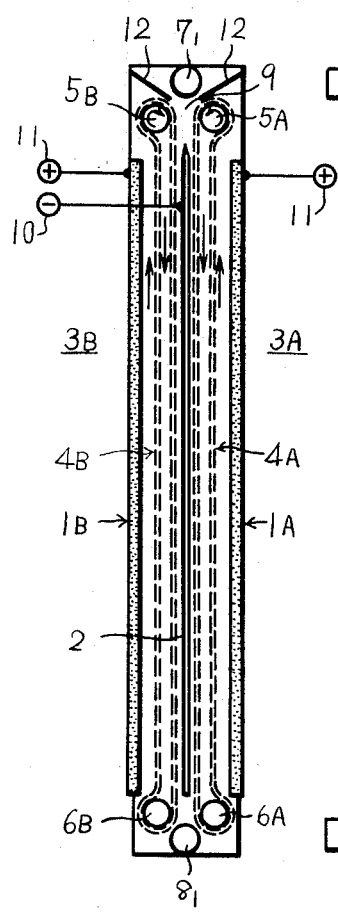
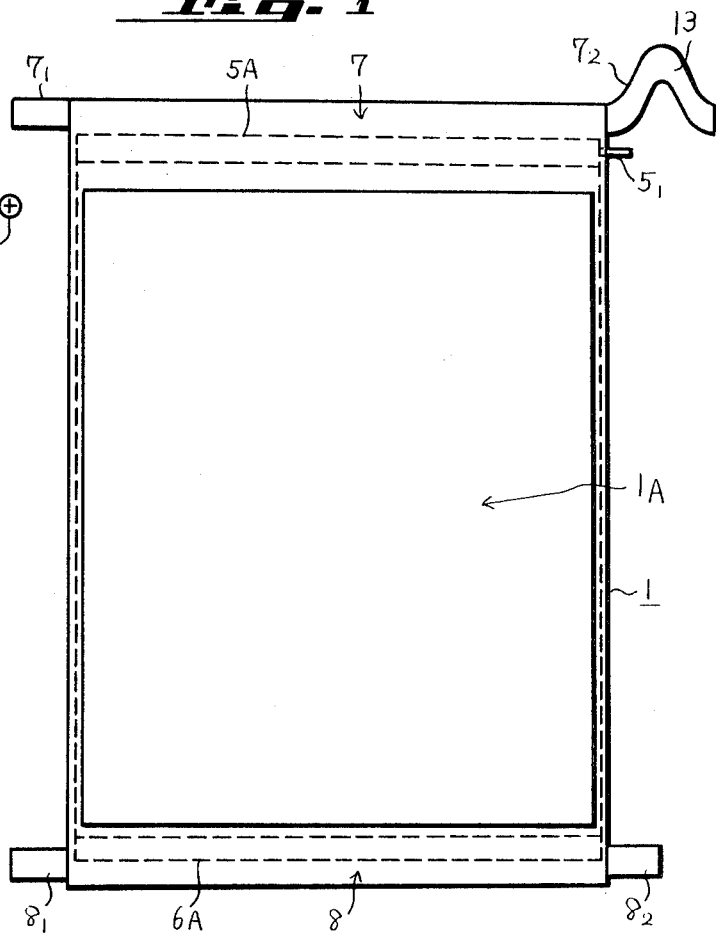
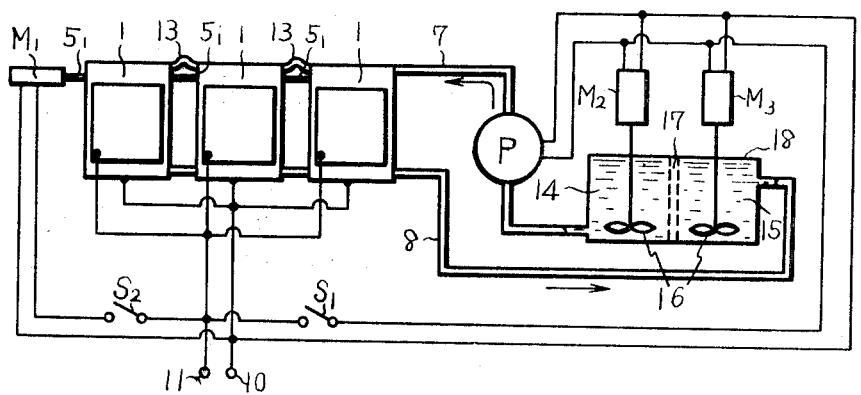
INVENTOR.
HIDEO BABA

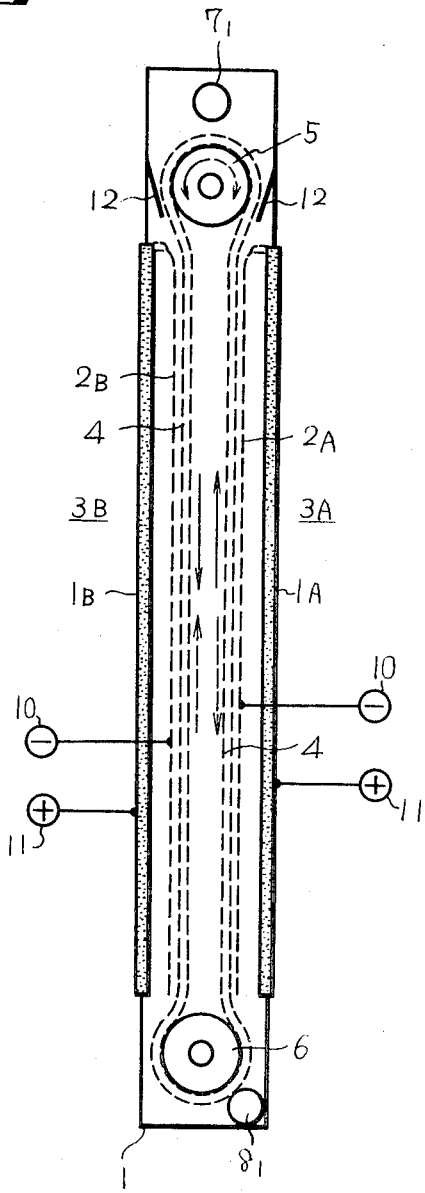

United States Patent Office 3,592,698
Patented July 13, 1971

3,592,698
METAL FUEL BATTERY WITH FUEL SUSPENDED IN ELECTROLYTE
Hideo Baba, Tokyo, Japan, assignor to
Sony Corporation, Tokyo, Japan
Filed Nov. 18, 1968, Ser. No. 776,548
Claims priority, application Japan, Nov. 20, 1967,
42/74,625
Int. Cl. H01m 29/04
U.S. Cl. 136—86                                    11 Claims

ABSTRACT OF THE DISCLOSURE

A metal fuel battery consisting of a liquid-containing chamber, at least one wall of which is a gas diffusion positive electrode including a metal oxidation catalyst therein, a negative electrode positioned in the chamber and spaced from the positive electrode, a liquid electrolyte having a finely divided metal fuel powder suspended therein and means for circulating the electrolyte through the chamber.

BACKGROUND OF THE INVENTION

This invention relates to a metal fuel battery and more particularly to a construction thereof.

Batteries of the type using metal fuel are generally known in the art but they have a fatal defect such as difficulty in maintaining a continuous supply of the fuel.

A metal sodium-air fuel battery, which is one of the known batteries, is adapted for operation with a continuous supply of sodium amalgam. Other metals, for example, aluminum, zinc and so on can be similarly utilized in the form of amalgam but their concentrations in the amalgam cannot be rendered high, since this introduces additional disadvantage such as high cathode polarization. In addition, this method requires a large amount of mercury, so that the resulting battery is heavy and is inconvenient to handle. Accordingly, almost all known metal fuel batteries encounter a difficulty in providing a continuous supply of power source and hence necessitate replacement of the electrode plate, making it impossible to produce large metal fuel batteries.

The present invention has for its object the elimination of the aforementioned defect by continuously supplying metal fuel powder to a metal fuel battery using an electrolyte as a carrier or vehicle therefor.

One object of this invention is to provide a metal fuel battery which is adapted to be continuously supplied with metal fuel powder together with an electrolyte.

Another object of this invention is to provide a metal fuel battery having a collector for collecting electric power from metal powder dispersed in an electrolyte.

Another object of this invention is to provide a metal fuel battery which is adapted to make stable discharge for a long period of time with the use of a small amount of an electrolyte.

Another object of this invention is to provide a metal fuel battery of large capacity which is easily supplied with fuel and can be continuously used.

Still another object of this invention is to provide a metal fuel battery whose discharge can be controlled in accordance with the working condition.

Other objects, features and advantages of this invention will become apparent from the following description taken in conjunction with the accompanying drawings.

BRIEF DESCRIPTION OF THE DRAWING

FIG. 1 is a plan view showing one example of a single cell of a metal fuel battery produced according to this invention;

FIG. 2 is a side view of the single cell exemplified in FIG. 1;

FIG. 3 shows the entire system of the metal fuel battery employing the cell; and FIG. 4 illustrates another example of the single cell.

DESCRIPTION OF THE PREFERRED EMBODIMENTS

In FIGS. 1 and 2 reference numeral 1 generally designates a liquid containing cell container or chamber formed of a plastic material; 1A and 1B are platelike positive electrodes or gas diffusion electrodes, 2 is negative electrode collector plate made of, for example, brass which is a material having a low electrical resistivity and 3A and 3B are cells arranged to commonly utilize collector plate 2. The gas diffusion electrodes 1A and 1B require the establishment of a three-phase interface of gas (oxygen in this example), a solid active metal oxidation catalyst and an ionic electrolyte. At the interface, a process of adsorption and de-adsorption occurs, producing ions and an electrical charge. The electrical charge is drained from the electrodes through an external circuit and the fuel ions react with the oxidizing gas ions to form a neutral product. Such electrodes have been proposed variously in the art, any of which may be used in the present invention, but it is preferred to use gas diffusion electrodes disclosed in my copending U.S. applications Ser. No. 589,340, filed Oct. 25, 1966 and No. 716,718, filed Mar. 28, 1968 (both of which are incorporated herein by reference).

Generally, the gas diffusion positive electrodes disclosed in my aforesaid applications comprise a composite member including a metal oxidation catalyst, such as elemental silver, a low electrically resistivity plate-like portion and a porous backing portion which permits passage of an oxygen-containing gas but is impervious to liquids. Somewhat more specifically, the aforesaid Ser. No. 589,340 discloses a preferred form of a positive electrode which comprises, a porous conductive layer composed of a mixture of, for example, about 50% by weight silver carbonate powder, about 20% by weight elemental silver (200 mesh) and about 30% by weight polytetrafluoroethylene (10 mesh), and may include certain foaming agents; a nickel screen, and a porous liquid repellent layer containing small particle sized polytetrafluoroethylene powder, and may optionally include additional foaming agents. In forming the composite electrode member, the mixtures are individually placed in a suitable mold with the nickel screen therebetween and the so-filled mold is subjected to temperature-pressure conditions sufficient to produce a porous plate-like positive electrode. The aforesaid Ser. No. 716,718 discloses another preferred form of a composite positive electrode which comprises a porous conductive portion composed of a mixture of, for example, finely powdered nickel particles individually and uniformly coated with a thin layer of elemental silver and suitably discreetly sized fluorinated resin particles and a nickel screen. In forming the electrode member, the mixture is placed in a suitable mold and the screen is embedded into the mixture and the so-filled mold is subjected to temperature-pressure conditions sufficient to produce a porous plate-like positive electrode. In the cells 3A and 3B on both sides of the collector plate 2, fuel supply belts 4A and 4B are respectively stretched in a manner to be movable downward along the cathode collector plate 2. Reference numerals 5A, 6A and 5B, 6B indicate rollers for supporting the belts 4A and 4B, and the rollers, for example, 5A and 5B are driven from outside (a suitable drive means, not shown) in directions indicated by arrows. Reference numeral 7 identifies a fuel supply path common to the cells 3A and 3B and reference numeral 8 indicates a by-product removing path common to the cells 3A and 3B.

The belts 4A and 4B may be formed of a nap-like, mesh-like or similar material such, for example, as a felt of a polyamide resin. However, these belts should be made of a material which is not damaged by the electrolyte or which inhibits the passage of metal fuel therethrough. Instead the belts are made of a material that permits the free passage of only the electrolyte therethrough from the negative side to the positive side.

A description will hereinafter be given in connection with the operation of a zinc-air fuel battery of the type wherein spongy zinc powder produced as described later is supplied to each cell together with an electrolyte. The operation described hereinbelow is, of course, the same with fuel batteries of the same type employing oxygen itself or other oxygen-containing gases instead of air.

The zinc powder fuel is poured into an inlet $7_1$ of the fuel supply path 7 together with an electrolyte during passage in the path 7 the zinc powder fuel is deposited in a groove-like portion 9 defined by the two belts 4A and 4B and by the upper portion of the collector plate 2. The excess zinc powder and electrolyte run out from an outlet $7_2$ of the path 7 into the fuel supply path (not shown) of the next subsequent cell (not shown). The zinc powder fuel deposited in the groove-like portion 9 is transported downward along the collector plate 2 by the fuel supply belts 4A and 4B, during which the zinc powder fuel discharges and becomes dissipated upon reaching the bottom of the cells 3A and 3B, the resulting discharge by-products, that is, zinc hydroxide or zinc oxide are deposited on the by-product removing path 8 below the cells 3A and 3B. The spent by-products deposited on the path 8 are removed from an outlet $8_2$ of the path 8 by an electrolyte flowing therealong from an inlet $8_1$ thereof to the outlet $8_2$. During the discharge of the zinc powder fuel, a voltage is produced between the negative electrode collector plate 2 contacting the zinc powder and the positive gas diffusion electrodes 1A and 1B to make the former negative relative to the latter.

A negative terminal 10 is attached to the negative collector plate 2 and positive terminals 11 are attached to the positive electrodes 1A and 1B, through which terminals the resulting voltage is led out. The positive electrodes 1A and 1B may be formed together.

With a battery thus arranged in accordance with the principles of the invention, the metal fuel can be continuously supplied to the cell and a necessary amount of the metal fuel powder, such as spongy zinc powder, for the discharge is always supplied to sufficient electrical collector plate 2 by the movement of the belts 4A and 4B. Accordingly, a stable electrical discharge can be maintained for a long period of time with a small amount of electrolyte. Further, the moving speed of the belts 4A and 4B can be readily controlled in accordance with the required amount of discharge, so that if the belts are driven at such a speed as to complete the discharge of the zinc powder fuel by the time it is carried down to the bottom of the cells 3A and 3B, substantially no unreacted metal fuel powder reaches the by-product removing path 8 under the cells 3A and 3B. It is possible, of course, to intermittently transport the belts. According to my experiments, discharge efficiency of more than 70% can be obtained with the device described above. In addition, since the ful supply system and the by-product removing system are separate from each other, the separation of the discharge by-product can be effected and the fuel efficiency can be enhanced.

In the figures, reference numeral 12 designates guide plates for guiding the metal fuel powder to the groove-like portion 9 and numeral 5, designates a driving shaft of the roller 5A (a similar drive shaft is also provided for roller 5B). Further, a pipe 13 couples the outlet $7_2$ of the fuel supply path 7 with an inlet of the fuel supply path of the subsequent fuel battery. The pipe 13 is formed in a cone shape so as to prevent short-circuiting of adjacent batteries by zinc powder sedimented while electrical discharge is stopped. However, in the case of one battery, the coupling pipe 13 need not be cone-shaped, and some other means may be used for preventing such short-circuiting.

FIG. 3 schematically illustrates a fuel battery system employing a plurality of batteries constructed and operating in accordance with the principles of the invention.

Reference numeral 1 schematically indicates a plurality of batteries having fuel supply paths 7 and by-product removing paths 8 interconnected with one another and which are designed to continuously supply metal fuel, for example, metal powder to the batteries together with an electrolyte by means of a pump P. Reference numeral 18 designates a fuel tank consisting of a metal fuel chamber 14 and a waste disposal chamber 15 partitioned by a filter 17. The filter 17 is formed of glass fiber or the like but may be made of sintered glass powder and is used for preventing the spent by-product from flowing into the metal fuel chamber 14 from the chamber 15. It is preferred that the electrolyte is a potassium hydroxide solution and that the metal fuel-powder is spongy zinc powder obtained by pulverizing blocks resulting from electrolytic reduction. The spongy zinc powder deposited in the metal fuel chamber 14 is sufficiently stirred by means of a stirrer 16 driven by a motor $M_2$ to disperse the fine zinc powder as a suspension in the electrolyte. This suspension is different from the so-called chemical suspension, namely the zinc powder remains in a suspended state when stirred or immediately thereafter but it precipitates upon long standing. The term suspension in this specification is intended to refer to such a condition. The suspended spongy zinc powder is supplied to the batteries by the pump P to generate electricity as described above. Means are provided for circulating the electrolyte-metal fuel powder suspension through the batteries, such as the previously described belts, here shown as having drive shafts $5_1$, which are provided in each battery for driving the belts, and which are driven by a motor $M_1$.

The zinc hydroxide $(Zn(OH)_2)$ resulting from electrical discharge of the cells is dissolved in the electrolyte (in chamber 15) to raise the concentration of zinc contained therein. When the zinc concentration has become saturated, the zinc hydroxide becomes suspended in the electrolyte. Thereafter, the electrolyte is stirred by the stirrer 16 and is then filtered by the filter 17 provided within the waste disposal chamber 15 to remove the suspended zinc hydroxide, thereby ensuring that the metal fuel chamber 14 is continously supplied with only spongy zinc powder. Consequently, continuous power generation can be achieved until the zinc powder has been electrically consumed after discharge. Thereafter, the waste electrolyte and the discharge by-product are removed and new electrolyte and zinc powder are supplied.

The motors $M_1$, $M_2$ and $M_3$ for driving the belts 4A and 4B and the stirrer 16 are driven by, for example, about $\frac{1}{10}$ of the power generated by the fuel battery. Reference numerals $S_1$ and $S_2$ indicate switches for controlling the motors. While discharge is stopped, no power is produced and the motors cannot be driven. To avoid this, power generated by the fuel battery is charged in a secondary battery (not shown) for starting the motors. It is also possible, of course, that the rollers 5A and 5B are driven by other means, for example, manually, to start the cycle.

In the foregoing discussion the collector plate 2 is common to the two cells provided on the both sides thereof but the collector plate may be divided into two members 2A and 2B. The negative electrode collector plates 2A and 2B may be disposed, for example, on both sides of the belt 4 in opposing relation to the positive electrodes 1A and 1B as shown in FIG. 4. With such an arrangement, the belt 4 is transported by the rollers 5 and 6 in one direction (indicated by full line arrows) for a certain period of time to supply metal fuel powder to the one collector plate 2B and then the belt 4 is driven in a reverse direction (indicated by broken line arrows) to supply fuel to the other collector plate 2A. Thus, the two collector plates 2A and 2B are alternately supplied with fuel. Accordingly, in this case the belt 4 is composed of a material that does not become damaged by the electrolyte. However the belt material in this embodiment need not be rendered to permit only the passage of the electrolyte therethrough. However, the collector plates 2A and 2B should be made of a material that will permit free passage of only the electrolyte therethrough from the negative side to the positive side. Of course, the collector plates 2A and 2B and the positive electrodes 1A and 1B are insulated from one another and, if necessary, a separator (not shown) is interposed between them to prevent short-circuiting therebetween. In FIG. 4 the other elements are identified by the same reference numerals as in FIG. 2 and no description will be repeated for the sake of brevity. Further, it is possible to form a battery with one negative electrode (collector plate) and one positive electrode. In the case where the belts 4A and 4B are formed of a conductive material such as metal, and the collector plate may be left out, in which case, however, means are required for collecting electric power from the rollers 5A, 5B, or 6A, 6B.

It will be apparent that many modifications and variations may be effected without departing from the scope of the novel concepts of this invention.

I claim as my invention:

1. A plurality of metal fuel batteries interconnected to deliver a stable electrical discharge to a common terminal, each of said batteries consisting essentially of at least a liquid-containing cell having a plurality of outer walls, at least one of said walls being a gas diffusion positive electrode a liquid electrolyte solution consisting essentially of a potassium hydroxide solution and finely divided metallic zinc fuel powder suspended therein, a negative electrode mounted in said cell in spaced relation to said positive electrode for collecting electrical discharge from said battery, each of said batteries having a transport means moving said electrolyte solution in electrically working relationship past said electrodes thereof; each of said batteries having a fluid inlet interconnected with an adjacent battery and communicating with said transport means, a supply means selectively providing said electrolyte solution to the fluid inlet of one of said batteries; each of said batteries having a fluid outlet intercommunicating with an adjacent battery below the inlet thereof for removing spent electrolyte solution from each of said batteries; and a receiving means communicating with the fluid outlet of one of said batteries so as to receive spent electrolyte solution from said plurality of batteries.

2. The plurality of metal fuel batteries as defined in claim 1 wherein the supply means and the receiving means communicate with one another through a fluid permeable filter means whereby solids are maintained in said receiving means and fluids are passed to said supply means.

3. The plurality of metal fuel batteries as defined in claim 1 wherein the supply means and the receiving means are disposed in a common housing, a fluid permeable filter means is positioned within said housing to separate said housing into a supply chamber and a receiving chamber, each of said chambers being provided with an agitator means for maintaining substantial uniformity of the electrolyte solution therein.

4. A metal fuel battery comprising a liquid-containing cell, a pair of oppositely disposed gas diffusion positive electrodes defining outer walls of said cell, an electrolyte liquid at ambient temperatures, a finely divided metal fuel powder suspended within said electrolyte, and a pair of oppositely disposed negative electrodes for collecting electrical power from said battery and being electrically separated from said positive electrodes.

5. The metal fuel battery as defined in claim 4 wherein a selectively movable transport means is disposed between the pair of positive electrodes for moving the metal powder in an electric power producing manner past at least one of said negative electrodes.

6. A metal fuel battery comprising, a liquid-containing chamber having a plurality of walls, at least one of said walls having a porous plate-like positive electrode, a negative electrode mounted in said chamber in spaced relation to said positive electrode, said positive electrode being a composite member including a metal oxidation catalyst, a low electrical resistivity plate-like portion and a porous backing member which permits the passage of an oxygen-containing gas therethrough but it is impervious to liquids, said negative electrode being a low electrical resistivity plate-like member, a liquid electrolyte having a finely divided metal fuel powder suspended therein, and means for circulating said electrolyte through said chamber.

7. A metal fuel battery as defined in claim 6 wherein the metal fuel powder is zinc.

8. A metal fuel battery as defined in claim 6 wherein the metal is zinc and the electrolyte is potassium hydroxide.

9. A metal fuel battery as defined in claim 6 wherein the metal oxidation catalyst includes silver and the metal fuel powder is zinc.

10. A metal fuel battery comprising, a pair of porous plate-like positive electrodes, walls extending from the edges of one of said positive electrodes to the edge of the other of said positive electrodes thereby forming a liquid-containing chamber between said positive electrodes, a negative electrode mounted in said chamber between and spaced from said positive electrode, said positive electrodes each being a composite member including a metal oxidation catalyst, a low electrical resistivity plate-like portion arranged to face the interior of said chamber and a porous backing member which permits the passage of an oxygen-containing gas therethrough but is impervious to liquid arranged to face the exterior of said chamber, said negative electrode being a low electrical resistivity plate-like member, a liquid electrolyte having finely divided metal fuel powder suspended therein, and means for circulating said electrolyte through said chamber.

11. A metal fuel battery comprising, a liquid-containing chamber having a plurality of walls, at least one of said walls having a porous plate-like positive electrode, a negative electrode mounted in said chamber in spaced relation to said positive electrode, said positive electrode being a composite member including a metal oxidation catalyst, a low electrical resistivity plate-like portion and a backing member which permits the passage of an oxygen-containing gas therethrough but is impervious to liquids, said negative electrode being a low electrical resistivity plate-like member, a liquid electrolyte having a finely divided metal fuel powder suspended therein, a belt means mounted for rotation in said chamber and between said positive and negative electrodes, and means for rotating said belt means for continuously circulating said electrolyte past said positive and negative electrodes.

References Cited

UNITED STATES PATENTS

| | | | |
|---|---|---|---|
| 2,921,110 | 1/1960 | Crowley et al. | 136—86 |
| 3,391,027 | 7/1968 | Porter | 136—86 |
| 3,409,471 | 11/1968 | Sturm et al. | 136—86 |
| 3,440,098 | 4/1969 | Stachurski | 136—86 |
| 3,444,000 | 5/1969 | Gruber | 136—86 |
| 3,476,608 | 11/1969 | Griffin, Jr. | 136—86 |

FOREIGN PATENTS

| | | | |
|---|---|---|---|
| 17,651 | 1/1930 | Australia | 136—86 |
| 8,497 | 1886 | Great Britain | 136—86A |

ALLEN B. CURTIS, Primary Examiner